United States Patent
Angwin et al.

(10) Patent No.: US 6,246,688 B1
(45) Date of Patent: Jun. 12, 2001

(54) METHOD AND SYSTEM FOR USING A CELLULAR PHONE AS A NETWORK GATEWAY IN AN AUTOMOTIVE NETWORK

(75) Inventors: Alastair John Angwin, Chandlers Ford; David George Bevis, Eastleigh, both of (GB); James C. Colson, Austin, TX (US); Michael L. Fraenkel, Raleigh, NC (US); Ajei S. Gopal, Riverdale, NY (US); Sandeep K. Singhal, Raleigh, NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/240,294

(22) Filed: Jan. 29, 1999

(51) Int. Cl.$^7$ .................................................. H04L 12/56
(52) U.S. Cl. ......................... 370/401; 370/392; 370/466
(58) Field of Search .................................. 370/401, 402, 370/400, 310, 313, 282, 285, 277, 352, 465, 469, 466, 467, 471, 395, 389

(56) References Cited

U.S. PATENT DOCUMENTS

| | | | |
|---|---|---|---|
| 5,479,479 | * 12/1995 | Braitberg et al. | 455/404 |
| 5,497,412 | 3/1996 | Lannen et al. | 379/60 |
| 5,515,043 | * 5/1996 | Berard et al. | 340/988 |
| 5,519,621 | * 5/1996 | Wortham | 364/460 |
| 5,533,029 | 7/1996 | Gardner | 370/94.1 |
| 5,625,877 | 4/1997 | Dunn et al. | 455/34.1 |
| 5,732,074 | * 3/1998 | Spaur et al. | 370/313 |
| 5,742,668 | 4/1998 | Pepe et al. | 379/58 |
| 5,771,459 | 6/1998 | Demery et al. | 455/517 |
| 6,088,594 | * 7/2000 | Kingdon et al. | 455/457 |

FOREIGN PATENT DOCUMENTS 9824248   6/1998   (WO) ............................. H04Q/7/20

* cited by examiner

Primary Examiner—Alpus H. Hsu
Assistant Examiner—Brian Nguyen
(74) Attorney, Agent, or Firm—A. Bruce Clay; Marcia L. Doubet

(57) ABSTRACT

A method, system, and computer-readable code for using a cellular phone as a network gateway in an automotive network. The proposed technique defines a novel way for using the phone's protocol stack and transmission capabilities (together with an adapter) to enable devices on a network in a vehicle to communicate with an external network, while still allowing the phone to work in "stand-alone" mode (i.e. not connected to the vehicle network) where it can communicate to a remote computer as a network client. Further, while the phone is plugged into the automotive network, it retains the ability to operate as a first-class network client. Devices in the vehicle no longer need to include transmission capabilities, thereby reducing their cost. The vehicle owner no longer needs to have a separate wireless subscription for both the phone and the automotive network devices, reducing costs even further.

22 Claims, 7 Drawing Sheets

METHOD AND SYSTEM FOR USING A CELLULAR PHONE AS A NETWORK GATEWAY IN AN AUTOMOTIVE NETWORK

BACKGROUND OF THE INVENTION

1. Field of the Invention

The present invention relates to a computer system, and deals more particularly with a method, system, and computer-readable code for using a cellular phone as a network gateway in an automotive network.

2. Description of the Related Art

Consumers today have come to expect easy access to information on a multitude of topics, no matter where they happen to be at the time. Many people have cellular phones and are able to make and receive phone calls whether they are at home, in their car, shopping in a store, etc. Using a computer with a wireless modem, mobile computer users are able to access countless information services. They may connect in this manner to their company's internal network in order to work while at home or while traveling. Or, they may connect to the Internet to check the latest stock quotations, do some electronic shopping, search for information, or perform any number of other tasks.

The expectation of readily-available information does not end when the consumer steps into his vehicle. Many types of electronic information devices are becoming common in vehicles. These devices include dashboard-based information systems (including vehicle navigation systems), back-seat entertainment, on-board maintenance, etc. With a vehicle navigation system, a driver is able to obtain directions to a particular destination from his current location, all while continuing to drive. He may also receive alerts about areas where traffic is congested, and may get information about the latest weather conditions. Televisions and VCRs are commonly installed in vehicles, providing entertainment for passengers. Vehicles may even have a fax machine on board, allowing passengers to send and receive faxed information without leaving the vehicle. On-board maintenance capabilities include receiving remote diagnosis of problems when a warning light comes on without having to go to a service station. Many emergency services are also available using on-board devices. These services include: dialing "911" in response to a voice command; remotely receiving a signal that will unlock the vehicle, this signal perhaps being transmitted from the vehicle manufacturer when the driver has locked himself out; and sending a signal from the vehicle if the airbags deploy. Many of these electronic information devices need access to an external network to perform their services. Radio transmitters are typically used today for this communication; however, radio transmitters are expensive, and it is therefore undesirable to equip each individual automotive device with its own transmitter.

A cellular phone can serve as a network communication device, transmitting data either over an analog call or using digital packets. In fact, a new generation of these phones (such as the Nokia 9000, from the Nokia company) includes a fill network client protocol stack to enable applications running on the phone to communicate with Internet-based services. The protocol stacks in phones currently use TCP/IP (Transmission Control Protocol/Internet Protocol), but many are likely to be WAP-based (Wireless Application Protocol) in the fixture. However, because the cell phone is a consumer device, there is a desire to keep the software (and thus memory) footprint small in order to minimize manufacturing and retail costs.

Microsoft Corporation's AutoPC is a device for use in a vehicle, and it integrates many of the services described above. It contains the electronics of a personal computer, which the user plugs into the slot in the car dashboard where the radio and compact disk player would normally be located. This device serves as the network hub through which the vehicle's devices communicate with each other, and it is assumed to have its own wireless network capabilities through which the vehicle's devices communicate with network services located outside the vehicle. An external cell phone may be plugged into a cradle in the device for voice dialing of phone calls, but its communication capabilities are not re-used to enable the other devices to communicate with external networks. Consequently, a user must pay for one or more transmission devices (in addition to the cellular phone), and the user must obtain multiple wireless subscriptions (one for the phone, and another for the separate transmission capability in the vehicle).

U.S. Pat. No. 5,732,074, "Mobile Portable Wireless Communication System," issued Mar. 24, 1998 to CellPort Labs, Inc., describes a communications system in a vehicle which uses a cellular phone to transmit data between a remote computer and a network of devices in a car over a standardized network communications link (such as TCP/IP). In this solution, the protocol stack is built into the vehicle as part of a controller device. Thus, the cell phone is simply used as a wireless modem, to transmit and receive analog signals that must then be interpreted by the on-vehicle protocol stack on their way from and to the devices on the vehicle network. This design does not reuse the cellular phone's own communications protocol capabilities, which enable the phone to be used as a data-enabled communications device while it is detached from the vehicle.

To minimize the cost of the transmission devices and subscription services, it would be beneficial to be able to use a cellular phone not only in its normal "stand-alone" mode where it can communicate to a remote computer as a network client, but also to be able to use the phone's protocol stack and transmission capabilities to enable devices in a vehicle to communicate with an external network. The present invention enables a cellular phone, when plugged into the automotive network, to serve (together with an adapter) as a network gateway for devices on the automotive network. Further, according to the preferred embodiment, the phone retains its ability to operate as a first-class network client while plugged into the automotive network.

SUMMARY OF THE INVENTION

An object of the present invention is to provide a technique whereby a cellular phone can be used as a network gateway in an automotive network.

Another object of the present invention is to provide this technique in a manner that minimizes the memory and software required in the cellular phone, in order to minimize retail and manufacturing costs associated with using a cellular phone as an automotive network gateway.

Another object of the present invention is to provide this technique in a manner that minimizes the memory and software required in the gateway adapter located within the vehicle, in order to minimize retail and manufacturing costs associated with enabling network communications among devices located within the vehicle.

Yet another object of the present invention is to provide this technique whereby a cellular phone can be used in standalone mode or as a network gateway, through the settings of one or more switches.

A further object of the present invention is to reduce the costs involved with wireless subscriptions when a user has both a cellular phone and devices on an automotive network that need to communicate with an external network.

A further object of the present invention is to permit cellular phones using a variety of cellular network protocols to be utilized in vehicles having a variety of different communication bus architectures.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer readable code readable by a computer system in an automotive network for using a cellular telephone as a network gateway in an automotive network. This technique comprises: a cellular phone having a protocol stack, the protocol stack being adapted for sending and receiving packets over an air link to an external network using a communications capability of the phone; an adapter, the adapter enabling the phone to plug into the automotive network; an automotive network having one or more electronic information devices attached thereto; receiving, in a Media Access Control (MAC) layer encoder/decoder, a plurality of packets from the air link; sending, from the MAC layer encoder/decoder, a plurality of packets to the air link; receiving, in the adapter, packets from the phone and packets from the automotive network; and routing, in the adapter, the received packets to one of the automotive network, the phone, or the external network. In the preferred embodiment, receiving packets from the air link further comprises: removing an incoming MAC header from each of the received packets, creating a second packet; and sending the second packet to the protocol stack if the phone is not plugged into the adapter, and sending the second packet to the adapter otherwise; sending packets to the air link further comprises adding an outgoing MAC header to each of the packets to be sent, prior to sending each packet. Receiving packets in the adapter further comprises removing the incoming MAC header from each of the received packets, if such header exists. Routing packets further comprises determining a destination address of each of the received packets, and using the determined destination address in the routing. In an alternative embodiment, receiving packets from the air link further comprises: removing an incoming MAC header from each of the received packets, thereby creating a second packet; sending the second packet to the protocol stack if the phone is not plugged into the adapter; sending the second packet to the protocol stack if the phone is plugged into the adapter and a destination address in the packet indicates that the second packet is for the phones; and sending the second packet to the adapter otherwise. Preferably, the protocol stack is a Transmission Control Protocol/Internet Protocol (TCP/IP) stack. Or, the protocol stack may be a Wireless Application Protocol (WAP) stack. The communications capability of the phone is preferably a wireless modem. A hardware switch in the adapter is preferably used to determine if the phone is plugged in.

The present invention will now be described with reference to the following drawings, in which like reference numbers denote the same element throughout.

DESCRIPTION OF THE PREFERRED EMBODIMENT

Figure 1:
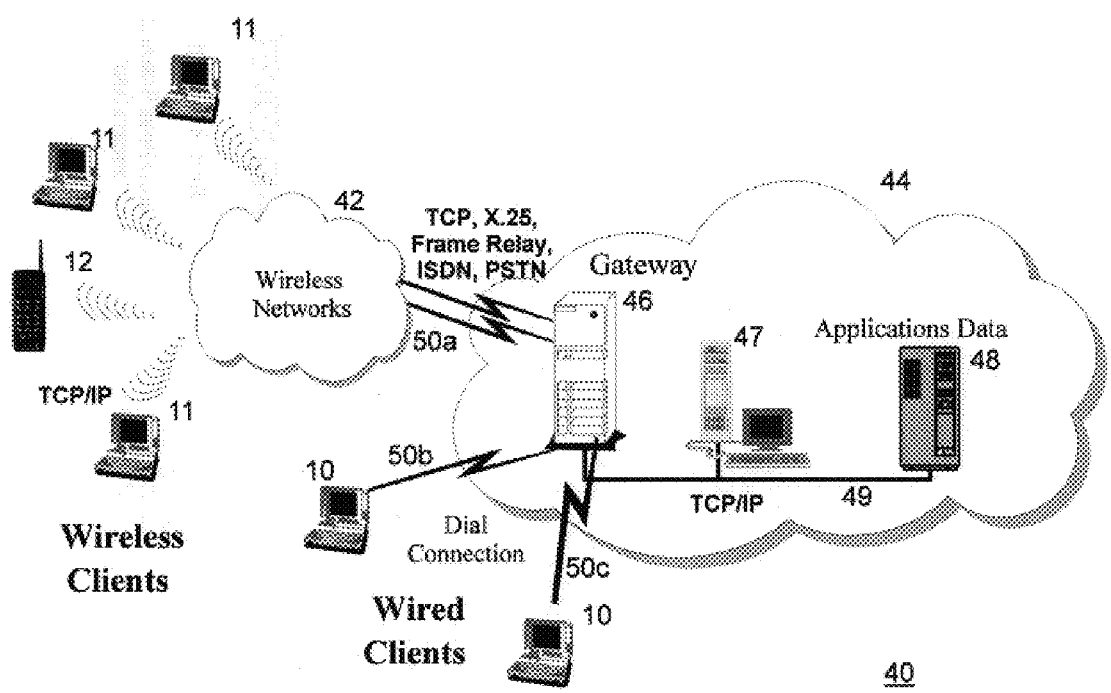
FIG. 1 is a block diagram of a networked computing environment in which the present invention may be practiced.

FIG. 1 illustrates a representative network computing environment in which the present invention may be practiced.

The data processing network 40 may include a plurality of individual networks, such as wireless network 42 and network 44, each of which may include a plurality of individual workstations 10, 11, 12. Additionally, as those skilled in the art will appreciate, one or more LANs may be included (not shown), where a LAN may comprise a plurality of intelligent workstations coupled to a host processor.

Workstations 10 are shown as wired clients and may be any type of device having processing and communication capabilities. A workstation 10 may communicate with other computers or networks of computers, for example via a communications channel or modem. Workstation 11 is similarly any type of computing device, connected to a wireless network. Specifically, cellular phone devices 12 are shown as connecting to wireless network 42 using wireless means. One example of the means in which the wireless link is made is using a wireless interface to the cellular phone 12, such as a CDPD (cellular digital packet data) card. The workstation 10, 11, 12 may be associated with other computers in a local area network (LAN) or a wide area network (WAN), or the workstation 10, 11, 12 can be a client in a client/server arrangement with another computer, etc. All of these configurations, as well as the appropriate communications hardware and software, are known in the art.

Still referring to FIG. 1, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10, 11, 12 may be located a substantial distance from the networks 42 and 44. For example, the network 42 may be located in California, while the gateway 46 may be located in Texas, and one or more of the workstations 10, 11, 12 may be located in New York. The workstations 11, 12 may connect to the wireless network 42 using a networking protocol such as TCP/IP. A number of alternative connection media may be used, such as cellular phone networks, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 1.

A user of the present invention will connect his vehicle automotive network (and his cellular phone, when in the standalone mode) to a server using a wireless connection from the cellular phone, as opposed to a wireline connection. Wireline connections are those that use physical media such as cables and telephone lines, whereas wireless connections use media such as satellite links, radio frequency waves, and infrared waves. In particular, a cellular modem may be used to establish a wireless connection.

The preferred embodiment of the present invention will now be discussed in more detail with reference to FIGS. 2 and 3.

Figure 2A:
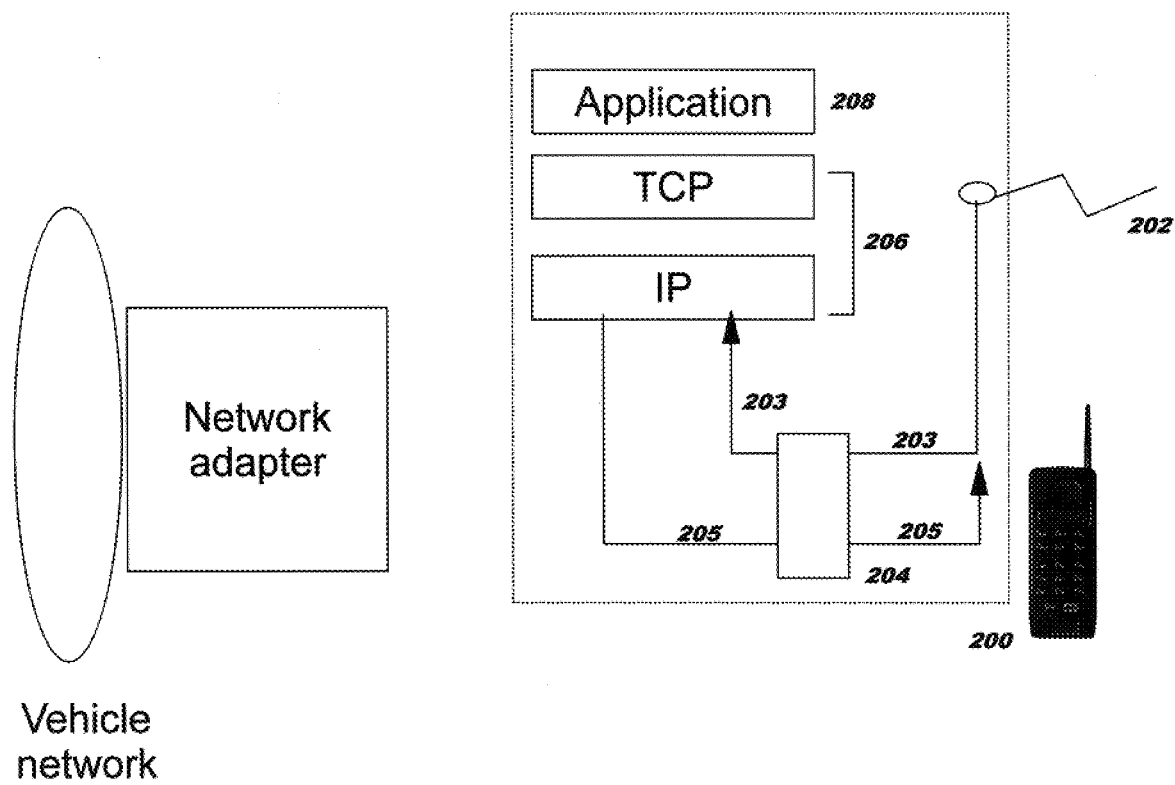
FIGS. 2A–2C show the flow of messages when the present invention is being used, both in standalone mode and in connected mode within an automotive network environment.

FIG. 2A shows the phone 200 being used in standalone mode - that is, not plugged into the automotive network. When in standalone mode, all inbound packets coming in on the wireless air link 202 are routed directly between the cellular MAC (media access control) layer encoder/decoder 204 and the protocol stack 206 in the phone. This is shown by the incoming packet path 203. All outbound packets (that is, those created by the client application 208 that is executing in the phone) are transmitted through the protocol stack 206 and MAC layer encoder/decoder 204 as shown by the outgoing packet path 205, and over the air link 202. The phone 200 therefore operates as a client device, sending 205 and receiving 203 packets from the remotely-connected server. In the preferred embodiment, the protocol stack 206 implements TCP/IP. Techniques for implementing a TCP/IP stack are well known in the art, and do not form part of the present invention. Alternatively, the protocol stack may implement other communications protocols such as WAP without deviating from the inventive concepts defined herein.

Figure 2B:
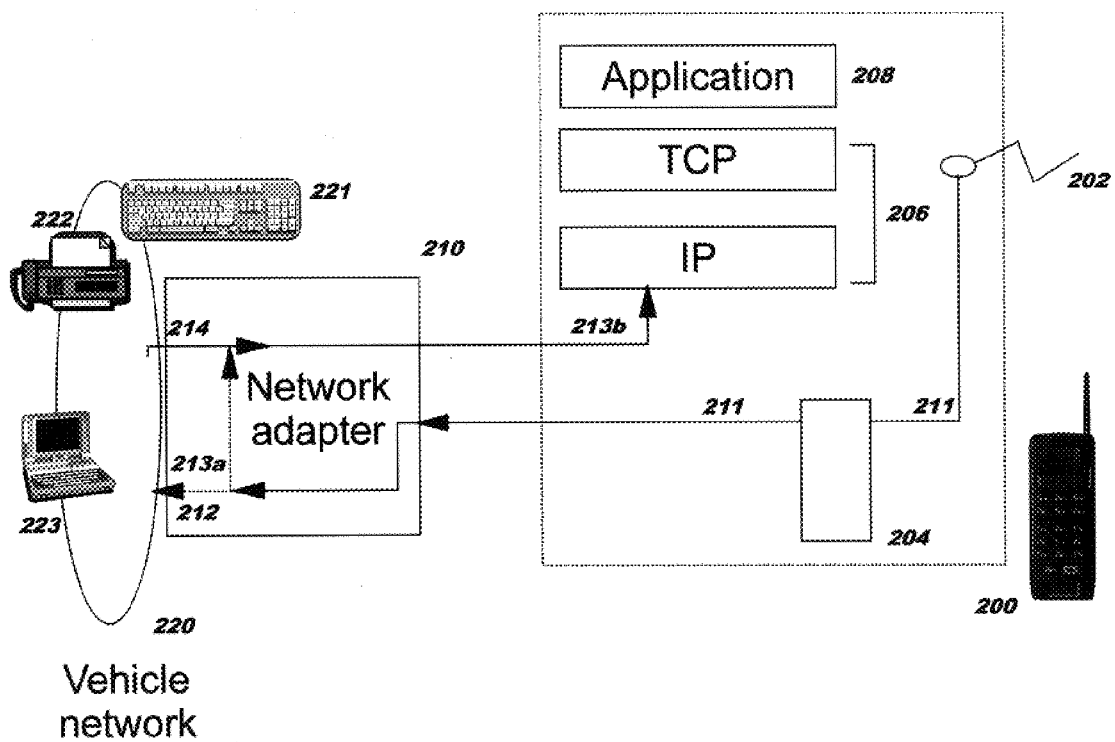
Figure 2C:
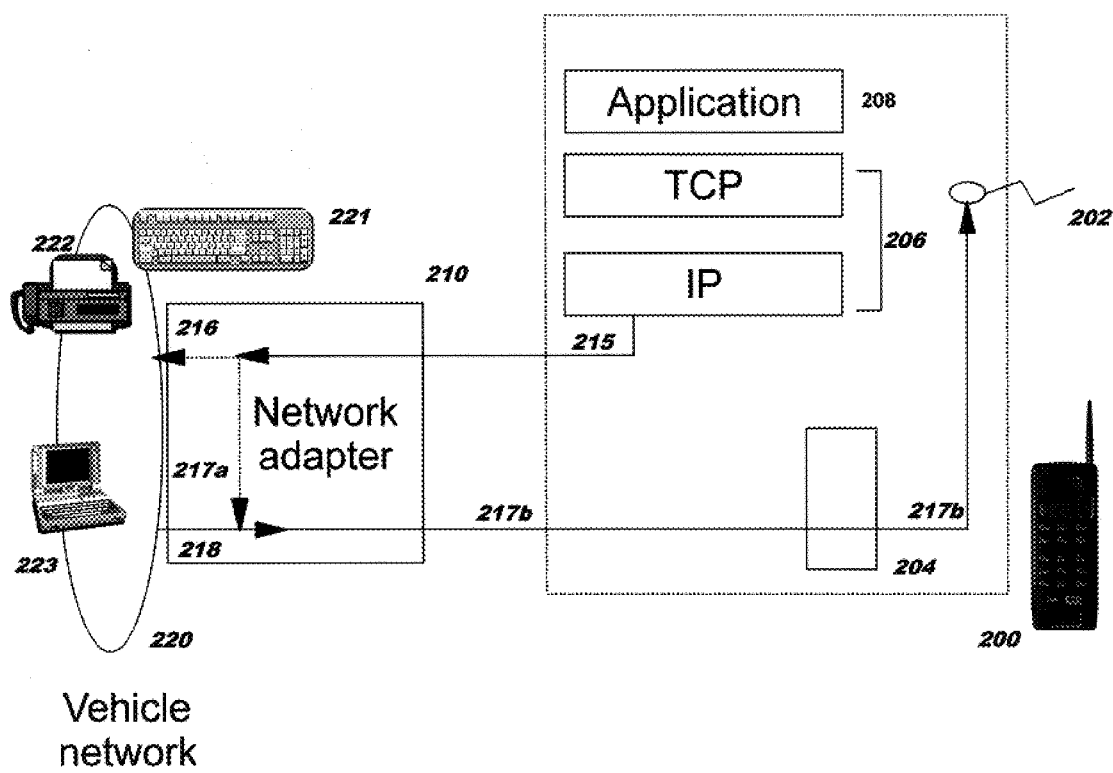

FIGS. 2B and 2C show the phone 200 plugged in to the automotive network 220 through adapter 210, enabling the phone 200 to serve as a gateway for the devices 221, 222, 223 on the network. The devices on the automotive network may be any type of device including a keyboard 221 for data entry; laptop 223, handheld, or mobile computers; facsimile machines 222 or scanners; vehicle navigation processors; game machines and back-seat entertainment systems; etc., having processing and communication capabilities. Three devices are shown in FIGS. 2B and 2C as being attached to the network 220. It is to be understood that this is for illustrative purposes only, and that more or fewer devices may be attached to the network. The remote server for which the phone is a gateway, similarly, can be one of any number of different types of computer having processing and communication capabilities, such as a mainframe computer, desktop computer, portable computer, mobile phone, etc. It is also to be understood that the remote server may itself be a device located within another vehicle's internal network. The techniques with which devices are connected to automotive networks, and with which remote servers are implemented, are well known in the art; the hardware devices and software which enable their use are readily available. Using a cellular phone as a gateway to enable communications between the devices and the remote server, however, is not known in the art and is the subject of the present invention. Hereinafter, the various types of devices on the automotive network will be referred to simply as "devices," and the remote server will be referred as a "server."

Figure 3A:
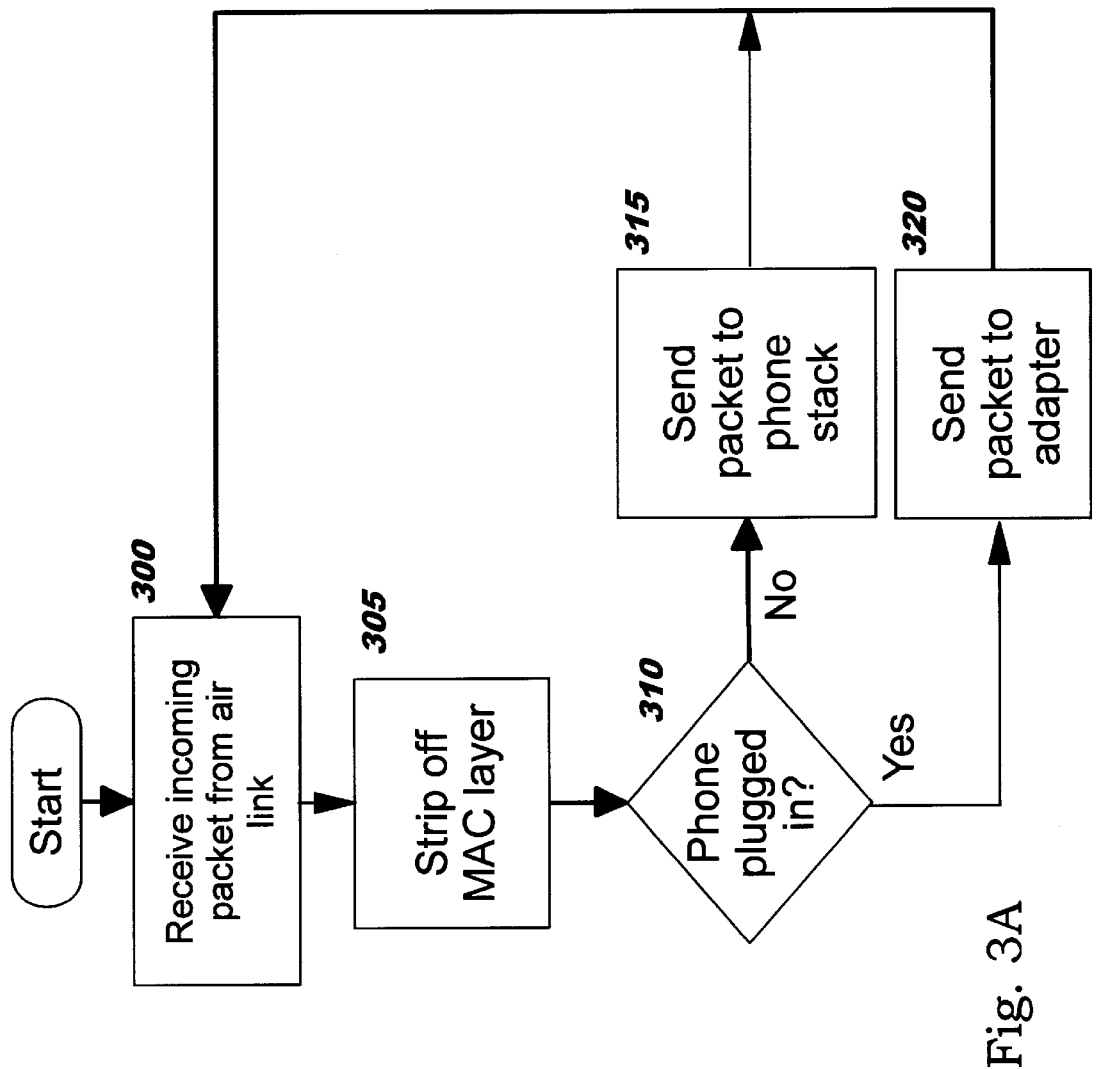
FIGS. 3A–3C illustrate the logic with which a preferred embodiment of the present invention may be implemented.
Figure 3B:
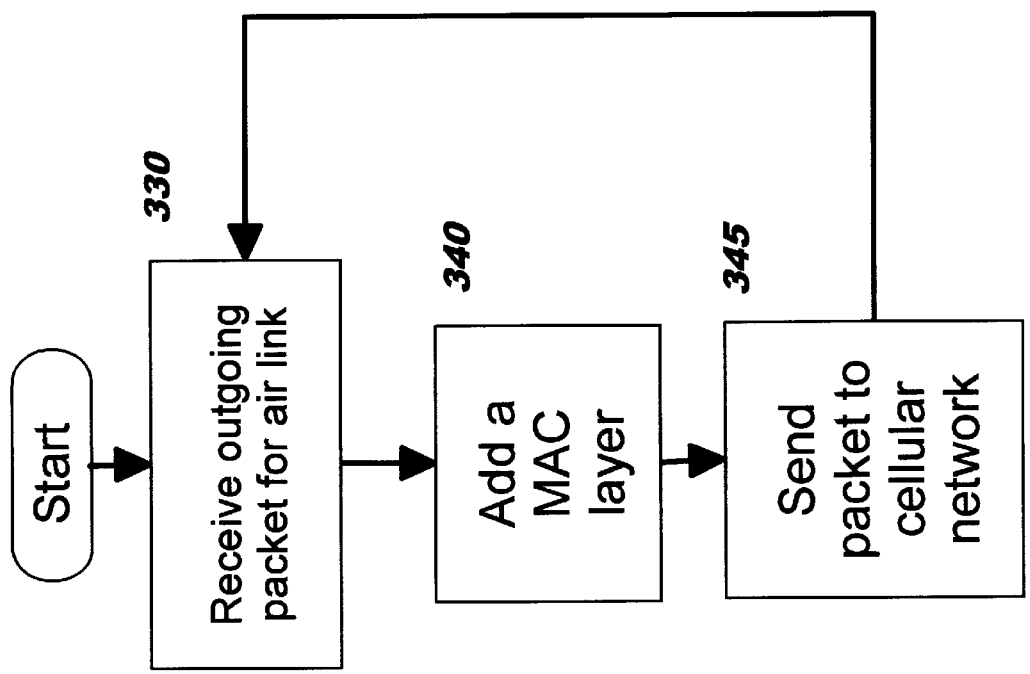

The present invention will be implemented within the cellular phone 200 and within the network adapter 210, and it may be implemented therein using software, hardware, or a combination of software and hardware. As previously stated, the cellular phone of the preferred embodiment of the present invention contains a TCP/IP stack. The MAC layer used with the TCP/IP stack is typically a low-level device driver that is separate from the TCP/IP stack. FIGS. 3A and 3B (discussed in detail below) depict the logic that the present invention performs between the processing of an existing MAC layer and the processing of an existing IP layer.

FIG. 2B shows the path 211 of an incoming packet from the air link 202 when the phone 200 is plugged into the network 220 through adapter 210. The inbound packets have their cellular MAC layer stripped off by encoder/decoder 204, and they are then forwarded to the car adapter 210. The car adapter 210 performs the routing function, either routing the packet to the wired car network 220 (shown as path 212) or routing the packets back to the protocol stack 206 in the cellular phone 200 (shown as path 213a and 213b), depending on the destination address in the incoming packet. As also shown in FIG. 2B, packets from the vehicle network that are destined for the cellular phone are received by the vehicle adapter 210 (as shown by path 214) and similarly routed to the cellular phone protocol stack over path 213b.

FIG. 2C shows the path 215 of an outgoing packet when the phone 200 is plugged into the adapter 210. Outbound packets from the phone 200 (i.e. those created by the application 208) are routed from the protocol stack 206 to the adapter 210 (shown as path 215) which, in turn, chooses whether to forward them to the vehicle network 220 (shown as path 216) or back through the phone 200 for transmission (shown as path 217a and 217b) to the cellular network over air link 202. As those packets pass through the phone along path 217a and 217b, they pass through encoder/decoder 204, which adds a cellular MAC header to the packet prior to transmission. As also shown in FIG. 2C, packets from the vehicle network that are destined for the cellular network are received by the vehicle adapter 210 (as shown by path 218) and similarly routed over path 217b through the phone 200 for transmission.

While the phone 200 is plugged into the network 220, any packets sent between the telephone and the other devices such as 221, 222, 223 on the network are, therefore, transmitted directly by way of the network adapter 210 and network 220 in the preferred embodiment, without being sent over the cellular network at 202.

The technique with which this invention is implemented decouples the cellular MAC layer from the TCP/IP (or WAP, etc.) stack. Two hardware switches are used to convert the phone between a client device and a pass-through router, enabling operation of the present invention according to the logic shown in FIG. 3. These switches are activated when the phone 200 is plugged into the adapter 210. One switch indicates whether incoming packets are to be sent to the phone (shown in FIG. 2A as path 203) or to the adapter (shown in FIG. 2B as path 211), and the second switch indicates whether outbound packets are to be sent to the adapter (shown in FIG. 2C as path 215) or out over the air link (shown in FIG. 2A as path 205).

Figure 3C:
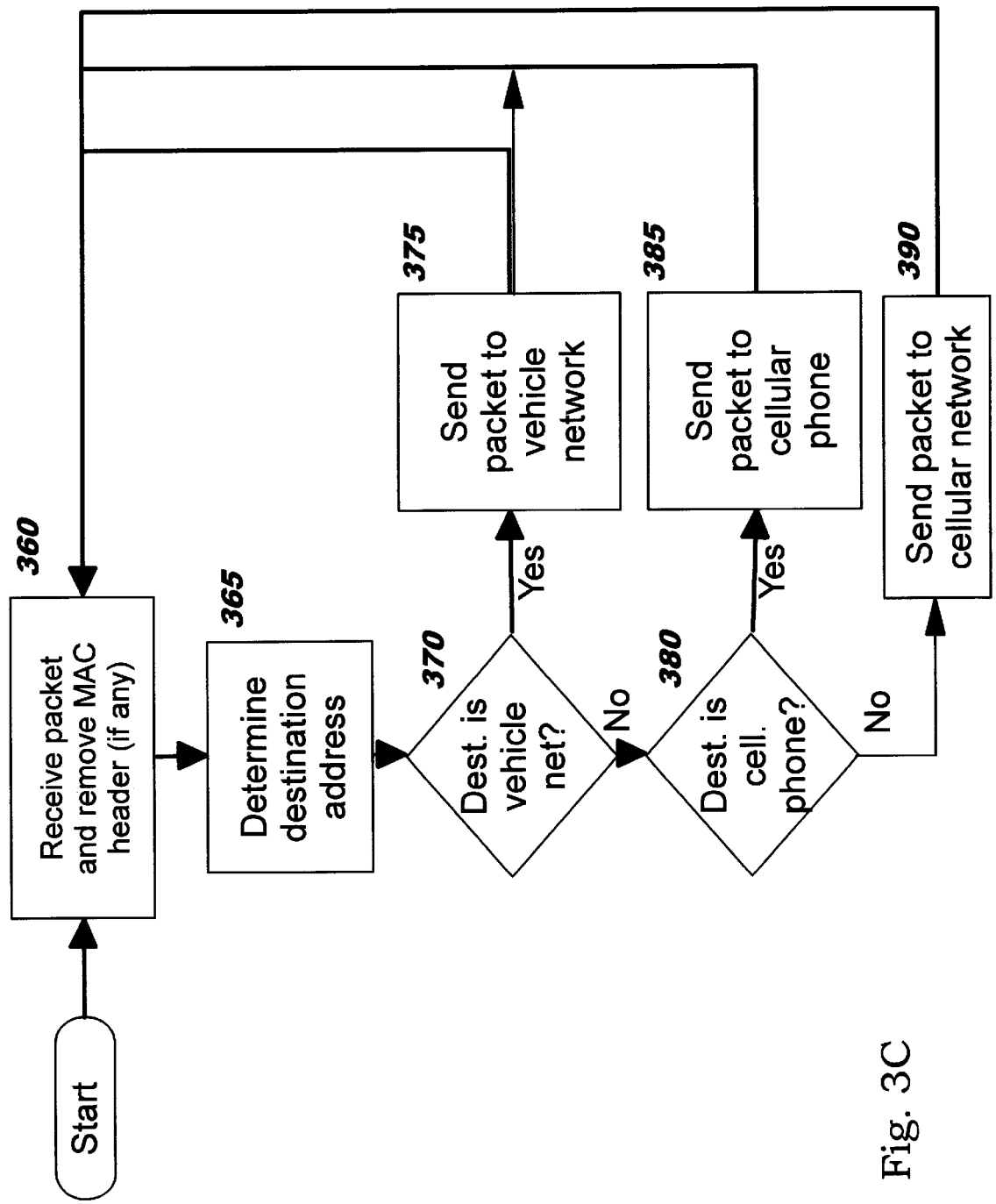

FIGS. 3A–3C illustrate flowcharts depicting the logic with which a preferred embodiment of the present invention may be implemented.

FIG. 3A shows the logic used in the MAC encoder/decoder 204 of the present invention to process packets received from the cellular network over air link 202; this processing corresponds to path 203 in FIG. 2A and path 211 in FIG. 2B. At Block 300, an incoming packet is received. Control transfers to Block 305, where the MAC encoder/decoder 204 strips off the MAC layer headers that were used for traversing the cellular network. Block 310 asks whether the phone 200 is plugged into the network 220 through the adapter 210. This test preferably makes use of the hardware switch discussed above, which detects whether the phone is plugged in. If not, then the phone 200 is operating in standalone mode, and the packet is sent to the protocol stack 206 running in the phone at Block 315. (The manner in which the application 208 running in the phone process es this incoming packet, upon its receipt, does not form part of the present invention.) Control then returns to Block 300 to await the next incoming packet. If the phone is plugged in, then it is operating as a network gateway and the test at Block 310 will have a positive response. Control transfers to Block 320, where the packet is forwarded to the vehicle adapter 210. Control then returns to Block 300, awaiting the next incoming packet.

FIG. 3B shows the logic used in the MAC encoder/decoder 204 for processing outgoing packets that are to be sent over the air link 202; this Figure corresponds to path 205 in FIG. 2A and path 217b in FIG. 2C. At Block 330, an outgoing packet is received. Block 340 puts a MAC layer header onto the packet to route it properly through the cellular network, and Block 345 sends the packet out over the air link. Control then returns to Block 330 to await receipt of the next outbound packet.

FIG. 3C depicts the logic used in the adapter 210, corresponding to the configurations shown in FIGS. 2B and 2C. At Block 360, the adapter receives a packet (as represented by paths 211 and 214 of FIG. 2B and paths 215 and 218 of FIG. 2C) and strips off the MAC header, if any. In the preferred embodiment of this invention, a MAC header should only exist on the packet if it originates on the vehicle network (i.e. it arrives over path 214 of FIG. 2B or path 218 of FIG. 2C); packets sent to the adapter through the phone, either from the air link path 211 of FIG. 2B) or from the phone's stack (path 215 of FIG. 2C), already have had their MAC layer header removed. Block 365 determines the destination address in the packet. Block 370 then asks if the destination address indicates one of the devices on the vehicle network. If so, the packet is sent to the vehicle network at Block 375 (path 212 of FIG. 2B or path 216 of FIG. 2C). Otherwise, control passes to Block 380, where it is determined whether the destination address indicates the cellular telephone. If so, the packet is sent to the protocol stack in the phone at Block 385 (path 213a and 213b if the packet originated from the air link, and path 213b if the packet came from the vehicle network, as shown in FIG. 2B). Otherwise, control passes to Block 390, where the packet is forwarded to the cellular phone for transmission to the cellular network (path 217a and 217b if the packet originated from the cellular phone, and path 217b if the packet came from the vehicle network, as shown in FIG. 3C). Following Block 375, Block 385, and Block 390, control returns to Block 360 to process the next packet to be received at the adapter. It is to be understood that alternative embodiments of the present invention may reverse the order of the tests performed in Blocks 370 and 380, without deviating from the inventive concepts disclosed herein.

The present invention separates MAC encapsulation over the vehicle network from MAC encapsulation over the cellular network. Consequently, the vehicle network itself can vary (that is, it may use protocols such as Token Ring, Ethernet, Universal Serial Bus, etc.) without forcing a change to the telephone device; the network adapter removes all vehicle bus MAC headers before forwarding packets to the telephone, either for local delivery or for the air link. Similarly, the cellular network itself may vary (that is, it may use protocols such as CDPD; Global System for Mobile communication, referred to as "GSM"; Personal Handyphone System, referred to as "PHS"; etc.), without forcing a change to the vehicle network adapter device; the cellular phone removes all cellular MAC headers before forwarding packets to the vehicle network adapter. According to the present invention, standardization of the interface between the network adapter and the cellular telephone allows any cellular phone to be plugged in to a particular vehicle and allows a particular cellular phone to be plugged into any vehicle.

Because the vehicle network (and the adapter) are independent of the MAC encapsulation and routing protocols used by the cellular phone, as explained above, both analog and digital phones are able to plug into the same automobile and provide the gateway functions. The present invention enables the use of commodity off-the-shelf TCP/IP stacks on the phone by locating all changes that occur within the phone in the MAC encoder/decoder component. This allows the phone's TCP/IP stack to be optimized to support only the client-side function (no server or routing function). This keeps the TCP/IP footprint small and minimizes the expense to the phone manufacturer (e.g. the only incremental cost for phone manufacturers wishing to provide the gateway service should be the cost of adding a plug adapter to the phone for attaching to the car network).

All devices on the car network communicate through the car adapter 20, which may choose to route the packets to the cellular network if the destination is outside the car. For purposes of simplicity, in the preferred embodiment of the present invention, all packet routing is done by the adapter (as shown in FIG. 3C and discussed above). However, in an alternative embodiment, packets that arrive from the air link and are destined for the phone are not routed to the adapter and then back to the phone. Instead, a local address check is performed within the phone, after determining that the phone is being used as a gateway. Implementing this alternative embodiment requires simple modifications to the logic of FIG. 3A. The local address check is implemented by adding another decision block following a positive response at Block 310 of FIG. 3A. This local address check determines whether the packet's destination address is the application executing in the phone. If so, then the packet is directly routed to the protocol stack in the phone by transferring control to the logic of Block 315, and if not, the packet is forwarded to the adapter for routing to the car network by transferring control to the logic of Block 320 in FIG. 3A.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. Computer readable code for using a cellular phone as a network gateway in an automotive network, wherein said cellular phone has a protocol stack embodied therein which is adapted for communicating over an air link to an external network using a communications capability of said cellular phone and wherein said automotive network has one or more electronic information devices attached thereto, said computer readable code being embodied in said cellular phone and in said automotive network and comprising:

a subprocess operating in a Media Access Control (MAC) layer encoder/decoder of said cellular phone for receiving incoming packets from said external network over said air link;

a subprocess for forwarding said incoming packets which are received by said MAC layer encoder/decoder to an adapter which operably connects said cellular phone to said automotive network, if said cellular phone is connected to said adapter, or through said protocol stack to said cellular phone otherwise;

a subprocess operating in said adapter for receiving packets, said received packets comprising (1) first outgoing packets from said cellular phone which have been forwarded from said cellular phone through said protocol stack, (2) second outgoing packets from one or more of said electronic information devices which have been forwarded over said automotive network, and (3) said incoming packets which have been forwarded from said MAC layer encoder/decoder;

a subprocess operating in said adapter for routing said received packets to one of (1) said automotive network for delivery to selected ones of said electronic information devices, (2) said protocol stack for delivery to said cellular phone, or (3) said MAC layer for delivery to said external network over said air link based on a destination address of said received packets; and a subprocess for sending to said external network over said air link, operating in said MAC layer encoder/decoder, said packets which are routed from said adapter to said MAC layer encoder/decoder.

2. Computer readable code for using a cellular phone as a network gateway in an automotive network according to claim 1, wherein:

said subprocess for forwarding said incoming packets further comprises a subprocess for removing an incoming MAC header from each of said incoming packets prior to said forwarding;

said subprocess for sending to said external network further comprises a subprocess for adding an outgoing MAC header to each of said packets to be sent, prior to sending each said packet;

said subprocess for receiving packets in said adapter further comprises a subprocess for removing said incoming MAC header from each of said received packets, if said incoming MAC header is present.

3. Computer readable code for using a cellular phone as a network gateway in an automotive network according to claim 1, wherein said protocol stack is a Transmission Control Protocol/Internet Protocol (TCP/IP) stack.

4. Computer readable code for using a cellular phone as a network gateway in an automotive network according to claim 1, wherein said protocol stack is a Wireless Application Protocol (WAP) stack.

5. Computer readable code for using a cellular phone as a network gateway in an automotive network according to claim 1, wherein said communications capability of said phone is a wireless modem.

6. Computer readable code for using a cellular phone as a network gateway in an automotive network according to claim 1, wherein said subprocess for forwarding said incoming packets further comprises a subprocess for using a hardware switch in said adapter to determine if said cellular phone is connected to said adapter.

7. A system for using a cellular phone as a network gateway in an automotive network, comprising:

a protocol stack embodied within said cellular phone, said protocol stack being adapted for communicating over an air link to an external network using a communications capability of said cellular phone, an automotive network having one or more electronic information devices attached thereto;

an adapter for operably connecting said cellular phone to said automotive network;

means, operating in a Media Access Control (MAC) layer encoder/decoder of said cellular phone, for receiving incoming packets from said external network over said air link;

means for forwarding said incoming packets which are received by said MAC layer encoder/decoder to said adapter if said cellular phone is connected to said adapter, or through said protocol stack to said cellular phone otherwise;

means, operating in said adapter, for receiving packets, said received packets comprising (1) first outgoing packets from said cellular phone which have been forwarded from said cellular phone through said protocol stack, (2) second outgoing packets which have been forwarded over said automotive network from one or more of said electronic information devices, and (3) said incoming packets which have been forwarded from said MAC layer encoder/decoder;

means, operating in said adapter, for routing said received packets to one of (1) said automotive network for delivery to selected ones of said electronic information devices, (2) said protocol stack for delivery to said cellular phone, or (3) said MAC layer encoder/decoder for delivery to said external network over said air link, based on a destination address of said received packets; and means for sending to said external network over said air link, by said MAC layer encoder/decoder said packets which are routed from said adapter to said MAC layer encoder/decoder.

8. The system for using a cellular phone as a network gateway in an automotive network according to claim 7, wherein:

said means for forwarding said incoming packets further comprises means for removing an incoming MAC header from each of said incoming packets prior to said forwarding;

said means for sending to said external network further comprises means for adding an outgoing MAC header to each of said packets to be sent, prior to sending each said packet; ad said means for receiving packets in said adapter further comprises means for removing said incoming MAC header from each of said received packets, if said incoming MAC header is present.

9. The system for using a cellular phone as a network gateway in an automotive network according to claim 7, wherein said protocol stack is a Transmission Control Protocol/Internet Protocol (TCP/IP) stack.

10. The system for using a cellular phone as a network gateway in an automotive network according to claim 7, wherein said protocol stack is a Wireless Application Protocol (WAP) stack.

11. The system for using a cellular phone as a network gateway in an automotive network according to claim 7, wherein said communications capability of said phone is a wireless modem.

12. The system for using a cellular phone as a network gateway in an automotive network according to claim 7, wherein said means for forwarding said incoming packets further comprises means for using a hardware switch in said adapter to determine if said cellular phone is connected to said adapter.

13. A method for using a cellular telephone as a network gateway in an automotive network, comprising the steps of:
providing said cellular phone, said cellular phone having a protocol stack which is adapted for communicating over an air link to an external network using a communications capability of said cellular phone;
providing an adapter for operably connecting said cellular phone to said automotive network;
receiving, in a Media Access Control (MAC) layer encoder/decoder of said cellular phone, a plurality of incoming packets from said external network over said air link;
forwarding said incoming packets which are received by said MAC layer encoder/decoder to said adapter if said cellular phone is connected to said adapter or through said protocol stack to said cellular phone otherwise;
receiving packets, in said adapter, said received packets comprising (1) first outgoing packets from said cellular phone which have been forwarded from said cellular phone though said protocol stack, (2) second outgoing packets which have been forwarded over said automotive network from one or more electronic information devices which are attached to said automotive network, and (3) said incoming packets which have been forwarded from said MAC layer encoder/decoder;
routing, by said adapter, said received packets to one of (1) said automotive network for delivery to selected ones of said electronic information devices, (2) said protocol stack for delivery to said cellular phone, or (3) said MAC layer encoder/decoder for delivery to said external network over said air link, based on a destination address of said received packets; and
sending to said external network over said air link, by said MAC layer encoder/decoder, said packets which are routed from said adapter to said MAC layer encoder/decoder.

14. The method for using a cellular telephone as a network gateway in an automotive network according to claim 13, wherein:
said step of forwarding said incoming packets further comprises the step of removing an incoming MAC header from each of said incoming packets, prior to said forwarding;
said step of sending to said external network further comprises the step of adding an outgoing MAC header to each of said packets to be sent, prior to sending each said packet;
said step of receiving packets in said adapter further comprises the step of removing said incoming MAC header from each of said received packets, if said incoming MAC header is present.

15. The method for using a cellular phone as a network gateway in an automotive network according to claim 13, wherein said protocol stack is a Transmission Control Protocol/Internet Protocol (TCP/IP) stack.

16. The method for using a cellular phone as a network gateway in an automotive network according to claim 13, wherein said protocol stack is a Wireless Application Protocol (WAP) stack.

17. The method for using a cellular phone as a network gateway in an automotive network according to claim 13, wherein said communications capability of said phone is a wireless modem.

18. The method for using a cellular phone as a network gateway in an automotive network according to claim 13, wherein said step of forwarding said incoming packets further comprises the step of using a hardware switch in said adapter to determine if said cellular phone is connected to said adapter.

19. A system for using a cellular phone as a network gateway in an automotive network, comprising:
a protocol stack embodied within said cellular phone, said protocol stack being adapted for communicating over an air link to an external network using a communications capability of said cellular phone;
an automotive network having one or more electronic information devices attached thereto;
an adapter for operably connecting said cellular phone to said automotive network;
means, operating in a Media Access Control (MAC) layer encoder/decoder of said cellular phone, for receiving incoming packets from said external network over said air link,
means for forwarding said incoming packets which are received by said MAC layer encoder/decoder through said protocol stack to said cellular phone if said cellular phone is not connected to said adapter or if said cellular phone is connected to said adapter and a first destination address in said incoming packet indicates that said incoming packet is addressed to said cellular phone, and forwarding said incoming packets to said adapter otherwise;
means, operating in said adapter, for receiving packets, said received packets comprising (1) first outgoing packets from said cellular phone which have been forwarded from said cellular phone through said protocol stack, (2) second outgoing packets which have been forwarded over said automotive network from one or more of said electronic information devices, and (3) said incoming packets which have been forwarded from said MAC layer encoder/decoder;
means, operating in said adapter, for routing said received packets to one of (1) said automotive network for delivery to selected ones of said electronic information devices, (2) said protocol stack for delivery to said cellular phone, or (3) said MAC layer encoder/decoder for delivery to said external network over said air link, based on a second destination address of said received packets; and
means for sending to said external network over said air link, by said MAC layer encoder/decoder, said packets which are routed from said adapter to said MAC layer encoder/decoder.

20. The system for using a cellular telephone as a network gateway in an automotive network according to claim 19, wherein:

said means for forwarding said incoming packets further comprises means for removing an incoming MAC header from each of said incoming packets, prior to said forwarding;

said means for sending to said external network further comprises means for adding an outgoing MAC header to each of said packets to be sent, prior to sending each said packet; and said means for receiving packets in said adapter further comprises means for removing said incoming MAC header from each of said received packets, if said incoming MAC header is present.

21. A method for using a cellular telephone as a network gateway in an automotive network, comprising the steps of:

providing said cellular phone, said cellular phone having a protocol stack which is adapted for communicating over an air link to an external network using a communications capability of said cellular phone;

providing an adapter for operably connecting said cellular phone to said automotive network;

receiving, in a Media Access Control (MAC) layer encoder/decoder of said cellular phone, a plurality of incoming packets from said external network over said air link;

forwarding said incoming packets which are received by said MAC layer encoder/decoder through said protocol stack to said cellular phone if said cellular phone is not connected to said adapter or if said cellular phone is connected to said adapter and a first destination address in said incoming packet indicates that said incoming packet is addressed to said cellular phone, and forwarding said incoming packets to said adapter otherwise;

receiving packets, in said adapter, said received packets comprising (1) first outgoing packets from said cellular phone which have been forwarded from said cellular phone though said protocol stack, (2) second outgoing packets which have been forwarded over said automotive network from one or more electronic information devices which are attached to said automotive network, and (3) said incoming packets which have been forwarded from said MAC layer encoder/decoder;

routing, by said adapter, said received packets to one of (1) said automotive network for delivery to selected ones of said electronic information devices, (2) said protocol stack for delivery to said cellular phone, or (3) said MAC layer encoder/decoder for delivery to said external network over said air link, based on a second destination address of said received packets; and sending to said external network over said air link, by said MAC layer encoder/decoder, said packets which are routed from said adapter to said MAC layer encoder/decoder.

22. The method for using a cellular telephone as a network gateway in an automotive network according to claim 21, wherein:

said step of forwarding said incoming packets further comprises the step of removing an incoming MAC header from each of said incoming packets, prior to said forwarding;

said step of sending to said external network further comprises the step of adding an outgoing MAC header to each of said packets to be sent, prior to sending each said packet; and said step of receiving packets in said adapter further comprises the step of removing said incoming MAC header from each of said received packets, if said incoming MAC header is present.

* * * * *